(12) United States Patent
Nicolas

(10) Patent No.: US 8,197,242 B2
(45) Date of Patent: Jun. 12, 2012

(54) DEVICE AND METHOD FOR SHEATHING A PLY OF THREADS

(75) Inventor: Serge Nicolas, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 13/167,048

(22) Filed: Jun. 23, 2011

(65) Prior Publication Data

US 2011/0308454 A1 Dec. 22, 2011

Related U.S. Application Data

(62) Division of application No. 12/156,588, filed on Jun. 2, 2008, now Pat. No. 7,993,558.

(30) Foreign Application Priority Data

May 31, 2007 (FR) ...................................... 07 03926

(51) Int. Cl.
B05C 11/10 (2006.01)

(52) U.S. Cl. .......................... 425/113; 425/114; 425/145

(58) Field of Classification Search .................. 425/114, 425/113, 145

See application file for complete search history.

(56) References Cited

U.S. PATENT DOCUMENTS

| | | | |
|---|---|---|---|
| 3,728,056 A | 4/1973 | Theysohn | |
| 4,274,821 A * | 6/1981 | Kiemer | 425/114 |
| 4,329,133 A | 5/1982 | Gallizia | |
| 4,515,738 A | 5/1985 | Anders | |
| 5,527,499 A | 6/1996 | Miley | |
| 2001/0045254 A1 | 11/2001 | Senbokuya et al. | |
| 2005/0147702 A1 | 7/2005 | Higashi | |

FOREIGN PATENT DOCUMENTS

| | | |
|---|---|---|
| EP | 1 145 835 A | 10/2001 |
| FR | 2 101 168 A | 3/1972 |
| FR | 2 463 488 A | 2/1981 |
| GB | 923208 A | 4/1963 |
| JP | 08-103972 | 4/1996 |
| JP | 08 103972 A | 4/1996 |
| JP | 2003011205 | 1/2003 |
| JP | 2005246736 | 9/2005 |

* cited by examiner

*Primary Examiner* — Joseph Del Sol
*Assistant Examiner* — Kimberly A Stewart
(74) *Attorney, Agent, or Firm* — Cozen O'Connor

(57) ABSTRACT

A device for continuously sheathing a ply of threads, said ply being formed by an array of approximately mutually parallel threads. The device includes a thread guide, a coating chamber into which a first feed channel and a second feed channel run, which are independent of each other, connected to a first feed device and to a second feed device respectively and capable of delivering a first material and a second material under pressure and with a defined flow rate, and the outlets of which channels are placed above and below the plane of the ply of threads, and an output die. Pressure-measuring device, connected to a controller for controlling the pressure of each of the feed devices, are placed in the coating chamber facing and in line with each other, on either side of the plane of the ply and in the immediate vicinity of the outlet for the feed channels.

4 Claims, 2 Drawing Sheets

DEVICE AND METHOD FOR SHEATHING A PLY OF THREADS

This application is a Divisional of U.S. patent application Ser. No. 12/156,588, filed Jun. 2, 2008, now U.S. Pat. No. 7,993,558, which claims priority from Applications filed in France on May 31, 2007, No. 07/03926. The disclosure of U.S. patent application Ser. No. 12/156,588 is incorporated herein by reference.

RELATED APPLICATIONS

This application claims the priority of French application no. 07/03926 filed May 31, 2007, the content of which is hereby incorporated by reference.

FIELD OF THE INVENTION

The invention relates to the field of the manufacture of composite reinforcement products made up of threads embedded in thermoplastic or viscoelastic material.

More particularly, the invention relates to the manufacture of reinforcement plies widely used in the tires with which terrestrial vehicles are intended to be equipped.

BACKGROUND OF THE INVENTION

These plies, which are intended to constitute the carcase reinforcement or crown reinforcement plies of the tire, are formed from continuous threads that are approximately mutually parallel and arranged with a given transverse pitch. The threads are embedded in rubber.

The term "thread" is understood to mean any individual or cabled reinforcement thread, which is itself formed by an assembly of individual filaments. The threads may be, without distinction, of textile, composite or metallic nature.

The processes most widely used to manufacture these straight-thread plies consist in depositing a layer of rubber on both sides of the ply of threads using a calendar formed from two rolls capable of pressing the rubber sheets against each other so that the rubber penetrates into the free space between the threads until forming rubber bridges.

Also known are sheathing means in which the ply of threads passes through a coating die upstream of which there is a coating chamber communicating with a feed means capable of delivering a rubbery product under pressure and at a given flow rate. The ply of threads runs from a thread guide placed at the inlet of the device into the coating chamber, where the mixture under pressure penetrates into the free spaces between the threads, and emerges from the device by passing through a sizing die intended to give the semi-finished ply a precise thickness.

Material feed means, such as for example one or more single-screw extruders, feed the coating chamber via one or more channels opening onto the upper part or onto the lower part of the ply of threads.

This technique has, inter alia, the advantage of allowing very regular series of rubber bridges to be formed because of the very good impregnation of the threads due to the high pressure within the coating chamber. Its use is particularly suitable for producing narrow straight-thread plies, similar to strips, and intended for production, by winding said strips onto the blank of a tyre in the process of being built. Another application consists in producing reinforcement plies making a given angle to the circumferential direction, by juxtaposing portions of strips at a given angle.

However, the manufacture of modern tyres requires assemblies having increasingly complex and precise geometries, making it necessary to reconsider the use of the known means.

FIG. 1 shows a straight-thread ply of the type sought, in which the rubber compound A covers the threads F so that the upper back of the threads is located at a distance $e_{up}$ from the upper surface of the ply and the lower back is located at a distance $e_{low}$ from the lower surface of the ply, the total thickness of which is denoted by $E_{tot}$. It should also be noted that, in this type of ply, the distances $e_{up}$ and $e_{low}$ are not necessarily the same.

To manufacture a straight-thread ply as illustrated in FIG. 1 using a sheathing device, the thicknesses $e_{up}$ and $e_{low}$ are varied by displacing the plane of the ply of threads relative to the upper and lower edges of the die. The total thickness $e_{tot}$ is determined by the diameter of the threads, the run speed of the threads through the sheathing device and the pressure within the coating chamber.

This results in a number of difficulties associated with controlling the position of the ply of threads relative to the surface. This is because any variation in pressure between the flow of compound intended to feed the upper part of the ply and the flow of compound intended to feed the lower part of the ply causes the threads to move upwards or downwards.

To give an illustration, a pressure difference of 1 bar between the two flows over a length of 10 mm generates a force of 0.6 N perpendicular to the surface of the ply. It would be possible to increase the tension of the ply so as to prevent them from undergoing too great a displacement in the direction perpendicular to the surface of the ply. However, this technique remains limited in that the threads would then be liable to cut or damage the ply formed by an uncured and still very plastic elastomer.

The differences in pressure between the flows intended to feed material into the coating chamber, at the upper part and the lower part of the ply of threads respectively, are the consequence of a large number of parameters that it is not easy to bring under control. This applies in particular when it is desired to vary the pressure in the coating chamber according to the run speed of the ply of threads so as to maintain a constant total thickness $E_{tot}$. Other parameters also have an influence, such as the instantaneous temperature of the members in contact with the rubber compound, the localized differences in rheology of the compound, the extrusion speed, the diameter of the cords, the pitch of the cords and finally the shape and the geometry of the flow channels.

This results in a geometric irregularity in the rubber thicknesses on the back of the threads, which is not compatible with the desired precision.

SUMMARY OF THE INVENTION

One object of the invention is to provide a solution to the stated problem and to allow straight-thread plies to be manufactured by sheathing with the desired precision.

This and other objects are attained in accordance with one aspect of the present invention directed to a sheathing device for continuously sheathing a ply of threads with a thermoplastic or viscoelastic material (A, B), said ply being formed by an array of approximately mutually parallel threads (F), which device comprises a thread guide (35); a coating chamber (31) into which a first feed channel (10) and a second feed channel (20) run, which are independent of each other, connected to a first feed means (13) and to a second feed means (23) respectively and capable of delivering a first material (A) and a second material (B) under pressure and with a defined flow rate, and the outlets (11, 21) of which channels are placed above and below the plane of the ply of threads (F); an output die (32), through which guide, chamber and die the ply of threads (F) runs when the device is in operation; and pressure-measuring means (12, 22), coupled to a controller (40) for controlling the pressure of each of the feed means (13, 23), and located in the coating chamber (31) facing and in line with each other, on either side of the plane of the ply and in the immediate vicinity of the outlet (11, 21) for the feed channels (10, 20).

It is, therefore, possible to regulate said feed means in such a way that the pressure of the compound output by the first feed channel is equal to the pressure of the compound output by the second feed channel, irrespective of the pressure level that it is desired to establish in said chamber in order to regulate the total thickness $E_{tot}$ of the coated ply as a function of the speed of the ply of threads.

The pressure difference between the upper part and the lower part of the ply of threads is always substantially equal to zero, thereby preventing any displacement of the plane of the threads relative to the outlet die.

DETAILED DESCRIPTION OF THE DRAWINGS

Figure 1:
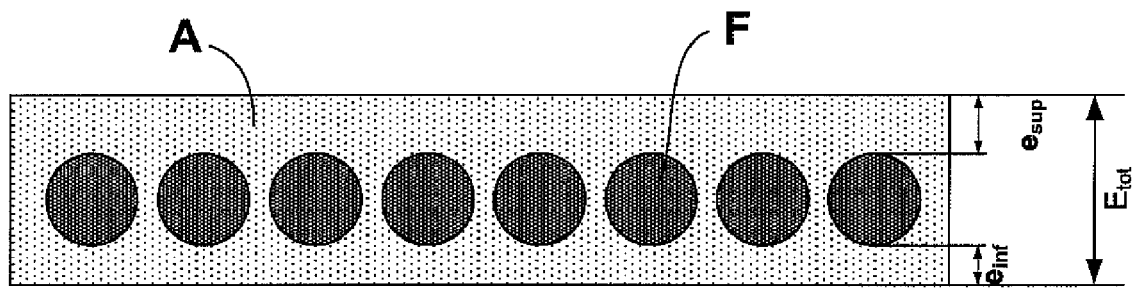
FIG. 1 shows a schematic sectional view of a ply of coated threads according to a first embodiment, and obtained with the process according to an embodiment of the invention.

As mentioned in the above paragraphs, FIG. 1 shows a first embodiment of a ply of coated threads that can be obtained with the process and the device according to an embodiment of the invention.

Figure 2:
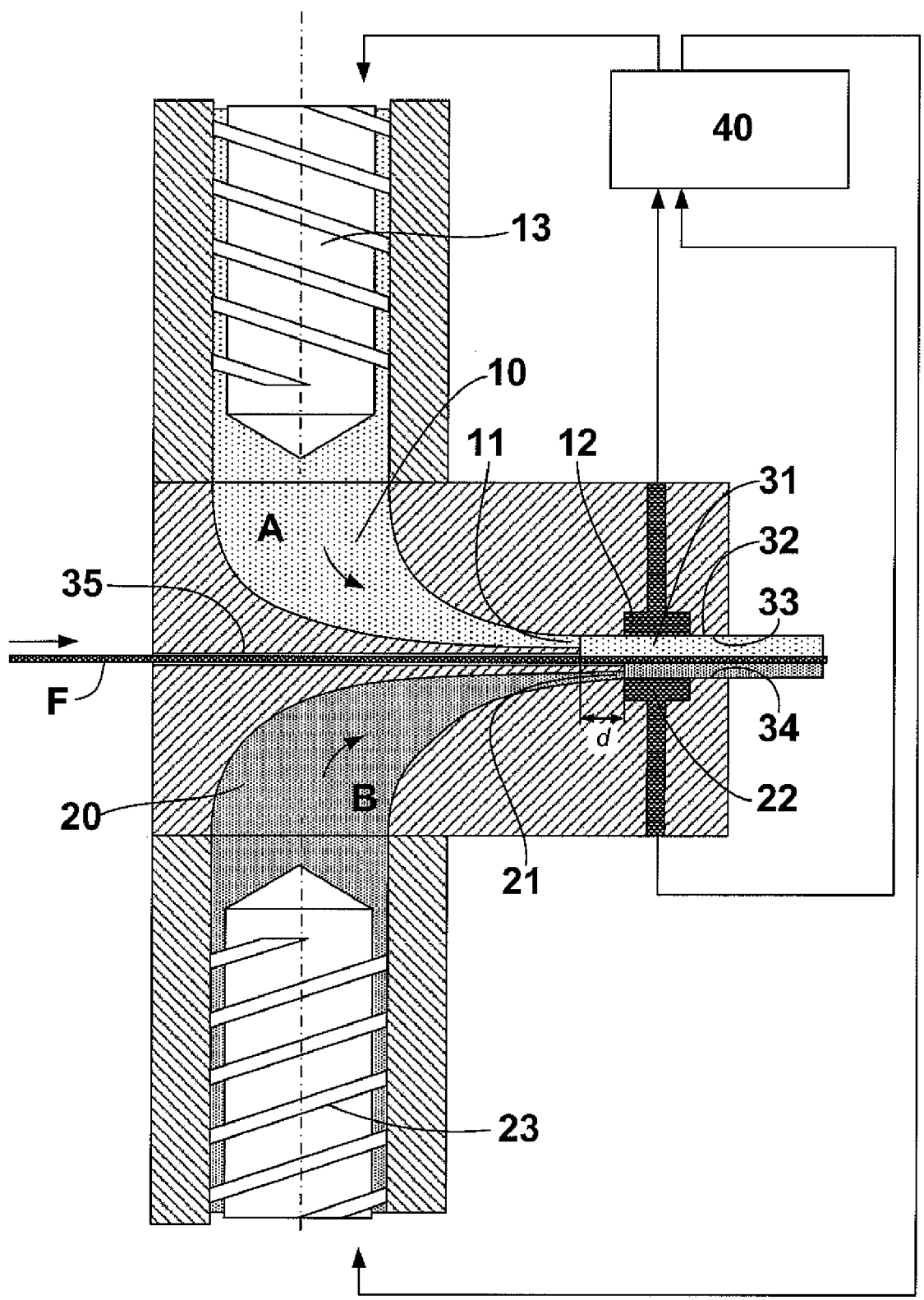
FIG. 2 shows a schematic sectional view of a device in accordance with an embodiment of the invention.

FIG. 2 illustrates a device according to an embodiment of the invention. The sheathing means is formed by a thread guide 35 located at the inlet of the device, and a coating chamber 31 into which a first feed channel 10 runs, the outlet 11 of which channel is placed above the plane of the ply of threads F. The outlet 21 of a second feed channel 20 also runs into the coating chamber 31 below the plane of the ply of threads F. The outlet of the device is formed by the die 32, which comprises an upper edge 33 and a lower edge 34, the separation between which serves to regulate the total thickness $E_{tot}$ of the coated ply. Means (not shown) cause the ply of threads to run at a given speed through the sheathing device. These means also place the threads F under tension.

Feed means 13 and 23 are connected to the feed channels 10 and 20 respectively. These feed means may be conventional extrusion means, of the type of those widely used in the rubber industry and comprising a screw rotated by a motor (not shown). Equivalently, and when the coating material is more fluid, it is possible to use a rotary pump or a positive-displacement pump. These means are capable each in their own way, to deliver the material (A, B) intended to coat the threads with a given flow rate and at a given pressure into the coating chamber (31) via the feed channels 10 and 20.

The material feed means 13 and 23 are separate from each other.

The device includes pressure-determining means 12 and 22, such as pressure sensors, placed in the coating chamber, facing and in line with each other, on either side of the plane of the ply, so as to measure the pressure at the point where the compound is liable to influence the position of the threads.

These pressure sensors are placed as close as possible to the outlets 11 and 21 of the feed channels 10 and 11 in such a way that the pressure difference between the two sides of the ply is dependent both on the pressure delivered by the feed means running into the outlet in question, and pressure variations occurring at the moment of coating the threads with each of the compounds and capable of causing displacement of the threads.

It is important for the sensors to be located quite precisely in line with each other so as to measure the forces that are exerted perpendicular to the plane of the ply at a given point.

These pressure-determining means are connected to a controller 40 for controlling the feed means 13, 23, so as to regulate the pressure in each of the feed channels according to a given setpoint.

Arrangements are therefore made for the pressure difference on either side of the plane of the ply to be approximately zero.

To prevent a slow drift of the system, the controlling of one of the feed means serves as a master means to which the controlling of the other feed means is slaved.

This device is therefore distinguished from the known regulating means, in which the pressure measurement means are placed inside the feed channel, and which do not allow fine changes in the pressure differences in a direction orthogonal to the plane of the ply to be detected.

FIG. 2 also illustrates an alternative embodiment of the device, in which the outlet 11 of the channel 10 is offset by a distance d relative to the outlet 21 of the channel 20 along the direction in which the ply of threads advances through the device.

This arrangement has the effect that the ply of threads is still partly held in place by the thread guide when the compound penetrates the upper part of the ply of threads. The threads are still supported on the thread guide, which prevents any movement of the ply of threads in a direction perpendicular to the plane of the ply.

The ply of threads is completely free of the influence of the thread guide only at the outlet 21 of the other feed means so that, when the compound penetrates into the lower part of the ply of threads, said ply is supported on the compound of the upper part. This results in better stability of the position of the threads and consequently better precision of the thicknesses $e_{up}$ and $e_{low}$.

As a result, the pressure sensors are placed close to the second end 21 and offset by a distance greater than d relative to the first outlet 11.

The device also has another advantage over the conventional devices in which the compound is from a single feed means.

Figure 3:
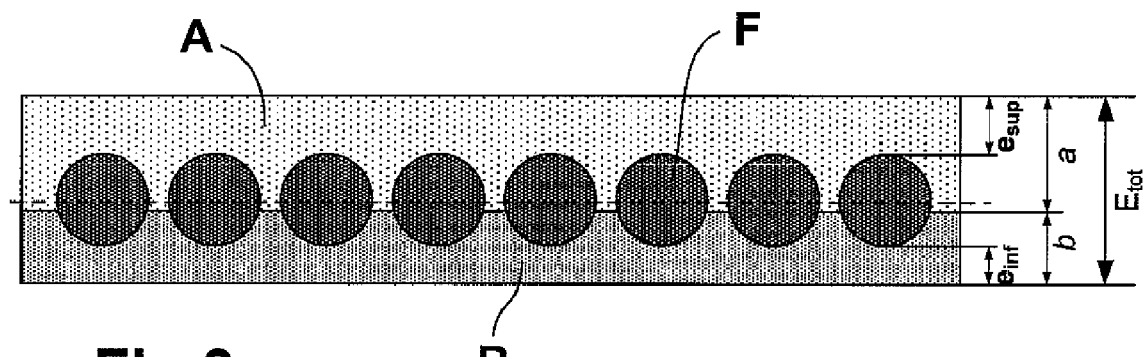
FIG. 3 shows a schematic sectional view of a ply of threads coated according to a second embodiment of the invention, and obtained by a process according to an embodiment of the invention.

This is because it is often necessary to produce a ply in which the rubber compound A forming the upper part of the ply is different from the rubber compound B forming the lower part of the ply, as illustrated by FIG. 3. In this configuration, the position of the centre of the threads, depicted in FIG. 3 by a dotted line, does not necessarily correspond to the line of separation between the compound A and the compound B.

It is therefore necessary for the respective thicknesses a and b of the compounds A and B to be controlled more precisely, the sum of said thicknesses being equal to the total thickness $E_{tot}$.

It has been demonstrated that it is possible to vary the thickness a relative to the thickness b by varying the distance d separating the outlet 11 of the feed channel 10 from the outlet 21 of the feed channel 20 without it being necessary to vary the pressure in the coating chamber, this being of primary importance for controlling the total thickness, as mentioned in the above paragraphs.

Another use of the device according to the invention consists in recording the pressure difference between the two measurement means 12 and 22 for fine control of the end product leaving the device. It is thus possible, when this difference exceeds a certain threshold, to conclude that the zone in which this anomaly occurs is unsuitable for being used in a subsequent manufacturing step. It suffices therefore to identify the zone in question by any means, without it being necessary to interrupt production of the coated ply, and to eliminate it from a subsequent manufacturing phase.

The device forming the subject of the present invention therefore makes it possible to solve the stated problem, which relates to controlling the geometry of the reinforcement plies, and also offers many prospects of varying the construction of tires.

The invention claimed is:

1. A sheathing device for continuously sheathing a ply of threads with a thermoplastic or viscoelastic material, said ply being formed by an array of approximately mutually parallel threads, which device comprises:
    a thread guide;
    a coating chamber into which a first feed channel and a second feed channel run, which are independent of each other, connected to a first feed means and to a second feed means respectively and capable of delivering a first material and a second material under pressure and with a defined flow rate, and the outlets of which channels are placed above and below the plane of the ply of threads;
    an output die, through which guide, chamber and die the ply of threads runs when the device is in operation; and
    at least two pressure-measuring means, coupled to a controller for controlling the pressure of each of the feed means, and located in the coating chamber facing and in line with each other, on either side of the plane of the ply and in the immediate vicinity of the outlet for the feed channels.

2. The sheathing device according to claim 1, in which the outlets of the feed channels are offset by a given distance along the direction in which the ply of threads according to the invention advances.

3. The sheathing device according to claim 1, wherein at least one of the thermoplastic and the viscoelastic material is a rubber-based viscoelastic material.

4. The sheathing device according to claim 1, wherein the material deposited on an upper face above the plane is different from the material deposited on a lower face below the plane.

* * * * *